Nov. 4, 1930.  E. P. BULLARD, JR., ET AL  1,780,222
CLUTCH
Filed Jan. 13, 1928  2 Sheets-Sheet 1

INVENTORS
EDWARD P. BULLARD Jr.
& GEORGE F. KOLB
BY
ATTORNEY

Fig. 2.

Patented Nov. 4, 1930

1,780,222

UNITED STATES PATENT OFFICE

EDWARD P. BULLARD, JR., OF STRATFORD, AND GEORGE F. KOLB, OF BRIDGEPORT, CONNECTICUT, ASSIGNORS TO THE BULLARD COMPANY, OF BRIDGEPORT, CONNECTICUT, A CORPORATION OF CONNECTICUT

CLUTCH

Application filed January 13, 1928. Serial No. 246,447.

Our invention relates to releasable friction clutches of a type especially adapted to automotive uses, although not necessarily so limited.

An important object is to provide multiple or laminated plate springs suitable for a clutch of the stated type, and further to provide a clutch design suitable for the use of such springs.

Another object is to provide a clutch structure which is capable of being arranged and secured together practically as a unit, for convenient shipment to motor vehicle manufacturers and easy and convenient assembly by them into the vehicle.

Another object is to provide a clutch having the above stated characteristics or advantages and which consists, except for the springs, practically entirely of cast iron parts, thus providing ample strength and rigidity for all necessary purposes without undue weight, and also providing very considerable economy, because of the elimination of pressed metal parts and relatively expensive pressing operations.

A further object is to provide various structural improvements.

The characteristics and advantages of the invention are further sufficiently explained in connection with the following detail description of the accompanying drawings, which show one exemplifying embodiment. After considering this example, skilled persons will understand that many variations may be made without departing from the principles disclosed, and we contemplate the employment of any structures that are properly within the scope of the appended claims.

Fig. 2 is a rear elevation, with some parts broken away or sectioned.

Figures 1, 3, 4, 5:
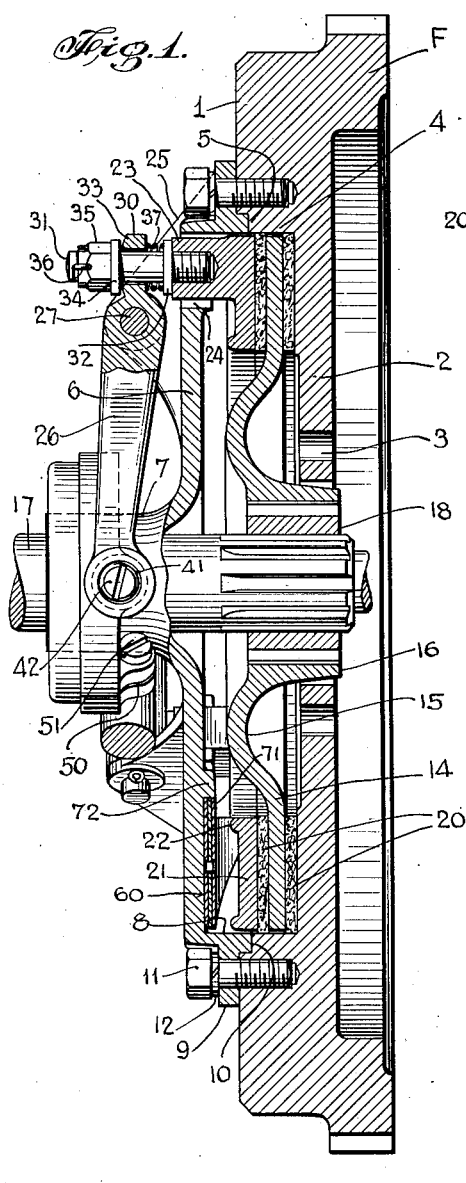
Fig. 1 is a section, in an axial plane, of a clutch embodying the invention in one form.
Fig. 3 is a section at 3—3, Fig. 2.
Fig. 4 is a section at 4—4, Fig. 2.
Fig. 5 is a side elevation of one of the multiple springs in natural or unstressed condition.

The engine fly wheel F may vary in its sectional form, the one shown being representative. The fly wheel does not really form a part of the clutch structure, but is rather a part of the engine of the motor vehicle, the clutch being arranged for shipment as a practically self-contained unit to the motor vehicle manufacturer and assembled by him into the vehicle by attachment of certain parts to the fly wheel and drive shaft. The fly wheel chosen as an illustration of one form to which the clutch is adapted or adaptable, comprises the flat rear face 1, the web or flange 2 having bolt holes 3 for connection to the crank shaft flange, the shallow cylindrical surface 4 constituting with the adjacent part of the web a recess for the clutch driven member and friction rings, and a shallow counterbore 5 at the rear end of the recess.

A principal part of the clutch proper is the housing, or pressure abutment plate 6, which is desirably of cast iron in generally shallow dished form, having a central, rearwardly-projecting sleeve or hub 7, a shallow peripheral wall 8, a flange 9 projecting therefrom, and a shallow cylindrical flange 10 fitting in the counterbore 5 of the fly wheel when flange 9 is applied to the flat rear face 1 thereof and secured as by screws 11 and lock washers 12. The housing 6 is referred to in some cases as the clutch driving member.

The driven member of the clutch consists of a plate or web 14, the inner part of which is bowed as at 15 to accommodate nuts on the bolts which attach the fly wheel to the crank shaft flange. The hub 16 of the driven member is fitted to the forward end of the driven shaft 17 in any suitable way as by spline connections, with or without an intermediate adapter 18. The outer area of the driven member provides friction surfaces to co-operate with friction rings 20 of any suitable material or composition, located between the driven plate and the fly wheel and between the driven plate and a pressure plate or ring 21. The driven plate or member and pressure plate may desirably be of cast iron. The pressure ring is desirably reinforced by shallow beads 22 on its rear face, at its inner and outer peripheries. Its flat forward face contacts with one of the friction rings 20. On its rear face the pressure plate has a suitable number, desirably three, of equally spaced driving lugs 23, which are desirably, though not necessarily, of square section, these passing with a fairly close sliding fit through complementally formed apertures 24 in the housing or abutment plate 6. These apertures are dimensioned in lateral directions to have only moderate clearance from the approximately radial faces of the driving lugs, but the apertures in their radial dimensions may be substantially longer than the radial dimension of the lugs, in order to avoid any necessity for extremely accurate centering of the pressure and abutment plates.

An approximately radial flange 25 is formed on the rear face of the housing at each side of each of the apertures 24, and a releasing lever 26 is mounted between each pair of flanges, on a fulcrum pin 27 having a head 28 secured in position in any suitable way, as by a cotter-pin 29. The outer, short arm 30 of each lever is apertured to provide a rocking fit about a releasing stud 31 screwed into the corresponding driving lug 23 against a stop washer 32. The rear face of the short arm is rounded as at 33 and engages a washer 34 held by a nut 35 which is secured in adjusted position by a cotter-pin 36. A light spring 37 is desirably located between the forward face of the lever short arm and the abutment washer 32 to maintain the rounded face of the lever in engagement with washer 34 and prevent undesirable play or rattle.

Figure 2:
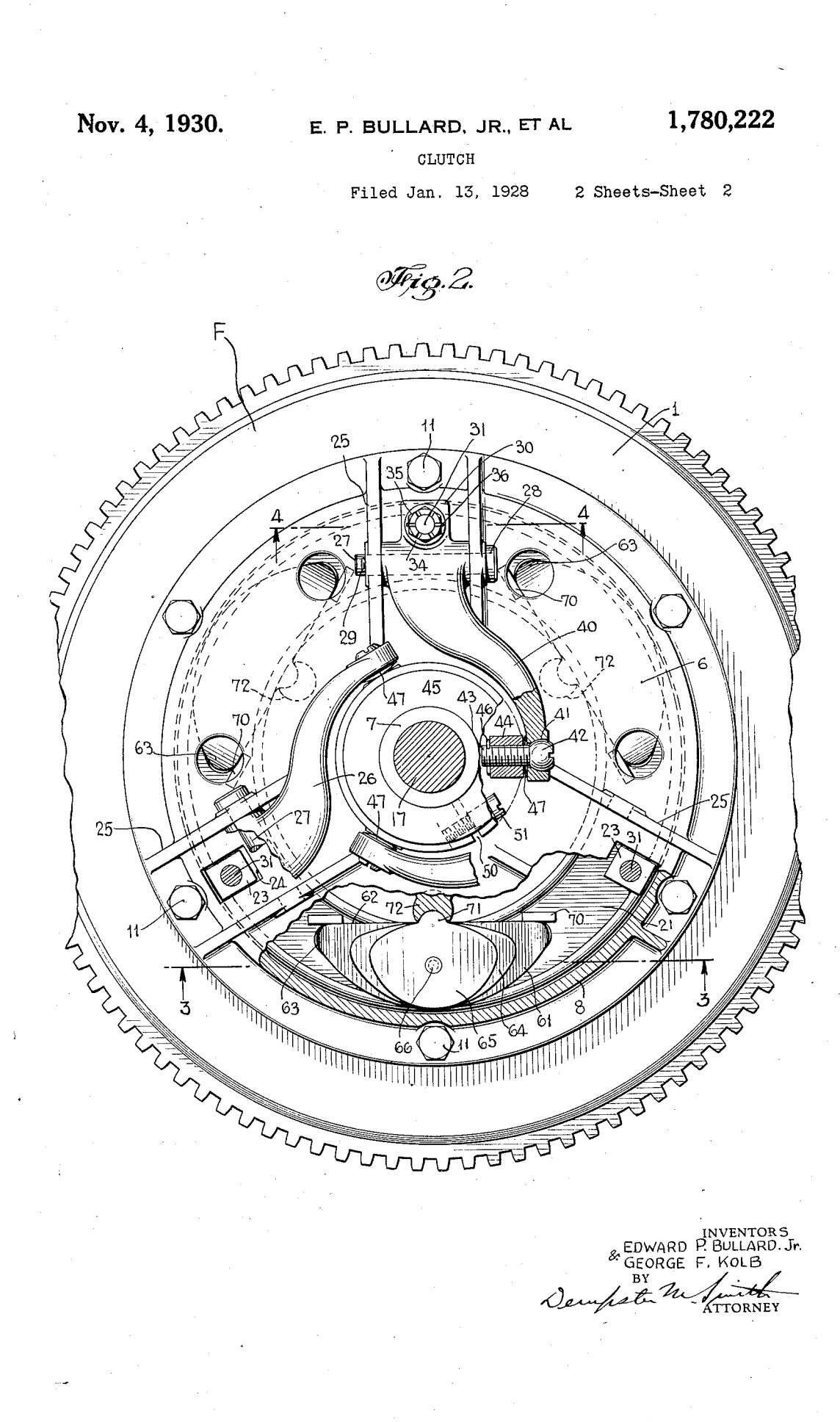

The long arm 40 of each lever is curved, as sufficiently shown in Fig. 2, and has at its inner end a socket 41 extending therethrough and comprising an outward cylindrical portion and an inner part-spherical portion to cooperate with the round head 42 of a screw 43 engaged in a lug 44 of a releasing collar 45, arranged to slide on sleeve 7 of the housing. The pivot screws 43 are locked in position by cotter-pins 46, and desirably dished spring washers 47 are interposed between the lugs 44 and the lever ends to take up play and rattle.

Desirably the releasing collar is split as at 50 and the split ends adjustably connected by a screw 51 to conveniently regulate the sliding fit of the collar upon the sleeve.

Clutch engagement is provided by springs 60, which we describe as "flat" springs in distinction from the helical springs usually employed in automotive clutches, or more accurately as "plat" springs. While each spring might consist of a single piece, preferably each is, as shown, composed of a plurality of pieces of sheet steel of suitable alloy, each piece being preferably hot-pressed to the correct bowed form as shown in Fig. 5. Specifically as shown each spring comprises a main leaf 61 of generally elliptical or ovate form, although the inward edge of the main leaf as it is located in the clutch may be nearly straight as at 62, Fig. 2, while the outer edge is curved, the main purpose being to provide a substantial taper in each direction from the center of the spring to the ends and thus to provide for substantially uniform deflection. The ends of this main leaf are curved upwardly as at 63. Superposed on the main leaf is a second or intermediate leaf 64, shorter than the main leaf, and generally oval or ovate in outline, to provide the desired taper to produce substantially uniform deflection. Finally, there is an outer or top leaf 65 shorter than the intermediate leaf and of approximately similar outline, for the same purpose. The number of leaves and their specific form may, of course, be varied substantially in accordance with various considerations of design. Desirably each spring leaf is hot pressed in deeply bowed form as best shown in Fig. 5, and the several parts are secured together by a central rivet 66. To correspond with the described lever arrangement, three of the multiple or laminated springs 60 are used, interspaced with the levers and located between the housing and the pressure ring, the spring center being located against the inner face of the housing and the spring ends bearing against the rear face of the pressure ring. As shown in Fig. 2 the springs are desirably so dimensioned that their points of bearing on the pressure ring are substantially equally spaced in a circular direction. In this way with only three springs there are provided six equally-spaced bearing points on the pressure ring, and this mode of application of the spring pressure together with the very substantial stiffness of the pressure ring practically prevents any distortion thereof under pressure and provides practically equal frictional contact of every part of the inner surface of the ring upon the friction ring 20, with a correspondingly satisfactory co-efficient of friction of the clutch as a whole, absence of unequal wear, etc.

The springs are desirably not locked in position by and devices analogous to screws or bolts, but are secured substantially positively and yet with slight freedom for self-adjustment in their working positions in the following manner: The rounded portions of the springs at their outer edges opposite their centers are located against or close to the inner surface of the shallow cylindrical flange 8 of the housing. The other edge of the spring near its ends bears against lugs 70 formed on the rear face of the pressure ring. Desirably, also, at the inward edge each spring plate is provided with a rounded projection or lug 71 engaging a complemental socket formation in a lug or stud 72 on the inner face of the housing.

After the clutch parts are assembled in the approximate positions shown, the plate springs are initially compressed to a very substantial degree by screwing down nuts 35 upon the studs 31 until the proper initial or normal spring pressure is obtained, whereupon the springs assume a moderately arcuate or bowed form, as shown in section in Fig. 3, and this adjustment is then fixed by inserting the cotter-pins 36.

In operation, the clutch is released by movement of the shifting collar toward the fly wheel, whereupon powerful leverage is exerted through the fulcrums 27 and applied by the rounded rear faces 33 of the short lever arms to washers 34 and nuts 35, thus slightly retracting the pressure ring, whereupon the driven member is released with accompanying slight deflection of the springs and very slight or imperceptible sliding movement of their ends upon the outer face of the pressure ring. Since the springs are direct-acting, that is, since they do not act through levers, and since they are very substantially deflected in their initial assembly or adjustment, slight wear of the friction surfaces produces very slight or imperceptible reduction in the pressure value. The clutch will, therefore, run for a long time under normal or even severe conditions of service, without necessity for adjustment, and when adjustment is necessary it is easily effected by slightly setting up the three nuts 35.

On account of the materials or style of construction employed, namely, cast iron of substantial section for the principal clutch parts such as the driven member, housing and pressure ring, these parts are practically entirely free from distortion or warping and consequently will run true with smooth and uniform action for a very long period.

By the use of plate springs of the character described we are able to produce a very compact clutch especially in the axial direction, since the plate springs arranged as shown permit the housing or pressure plate to be located quite close to the driven plate. The housing, therefore, while of cast iron, is relatively light because of its shallow form.

We claim:

1. A clutch of the class described, comprising a shallow housing having circularly-spaced apertures, a pressure ring within the housing having lugs passing through the apertures and slidably fitting same, a driven member, plate springs interspaced with the lugs, studs extending rearward from the lugs and having lever abutment members, releasing levers fulcrumed on the housing, having their short arms engaging the abutment members, and a shifting collar connected to the inward ends of the levers, the connections of the levers to the shifting collar comprising ball-ended studs engaged with the collar and sockets in the lever ends in which the ball ends of the studs are engaged, and clearance take-up washers intermediate the lever ends and the collar.

2. In a clutch of the character described, including a driven member adapted for connection to a shaft, a pressure plate, an abutment plate, and circularly spaced releasing levers operatively connected to the pressure and abutment plates, the combination therewith of laminated plate springs interspaced with the releasing levers and located between the pressure and abutment plates, the abutment plate having lugs with socket formations, and the springs having centrally at their inner sides lug formations located in said socket formations.

In testimony whereof we have signed this specification this 4th day of January 1928.

EDWARD P. BULLARD, JR.
GEORGE F. KOLB.